United States Patent
Wong et al.

(10) Patent No.: US 6,484,096 B2
(45) Date of Patent: Nov. 19, 2002

(54) WIRELESS VEHICLE MONITORING SYSTEM

(75) Inventors: Carlos C. H. Wong, Tuen Mun (HK); Leo S. C. Tsoi, Tuen Mun (HK)

(73) Assignee: Satellite Devices Limited, Hong Kong (HK)

( * ) Notice: Subject to any disclaimer, the term of this patent is extended or adjusted under 35 U.S.C. 154(b) by 0 days.

(21) Appl. No.: 09/811,273

(22) Filed: Mar. 16, 2001

(65) Prior Publication Data

US 2002/0038182 A1 Mar. 28, 2002

Related U.S. Application Data (60) Provisional application No. 60/210,172, filed on Jun. 6, 2000.

(51) Int. Cl.[7] .................................... H04B 7/185
(52) U.S. Cl. .................. 701/213; 701/214; 701/216; 455/427; 455/456; 342/450; 342/378; 342/357.09
(58) Field of Search ................. 701/213, 214, 701/216; 455/427, 429, 12.1, 456; 342/450, 362, 378, 357.09, 457; 375/347, 200

(56) References Cited

U.S. PATENT DOCUMENTS

| | | | |
|---|---|---|---|
| 3,568,161 A | 3/1971 | Knickel | 340/172.5 |
| 3,662,267 A | 5/1972 | Reed | 325/53 |
| 4,899,285 A | 2/1990 | Nakayama et al. | 342/357 |
| 5,068,656 A | 11/1991 | Sutherland | 340/989 |
| 5,142,281 A | 8/1992 | Park | 340/991 |
| 5,179,519 A | 1/1993 | Adachi | 340/990 |
| 5,220,509 A | 6/1993 | Takemura et al. | 340/988 |
| 5,293,318 A | 3/1994 | Fukushima | 342/357 |
| 5,416,712 A * | 5/1995 | Geier et al. | 342/357 |
| 5,570,087 A | 10/1996 | Lemelson | 340/870.05 |
| 5,604,765 A * | 2/1997 | Bruno et al. | 375/200 |
| 5,640,139 A | 6/1997 | Egeberg | 340/426 |
| 5,751,245 A | 5/1998 | Janky | 342/357 |
| 5,831,519 A | 11/1998 | Pedersen et al. | 340/425.5 |
| 5,844,473 A | 12/1998 | Kaman | 340/439 |
| 5,906,655 A | 5/1999 | Fan | 701/216 |
| 5,963,129 A | 10/1999 | Warner | 340/468 |
| 5,999,124 A * | 12/1999 | Sheynblat | 342/357.09 |
| 6,021,371 A | 2/2000 | Fultz | 701/200 |
| 6,204,812 B1 * | 3/2000 | Fattouche | 342/457 |
| 6,047,192 A * | 4/2000 | Maloney et al. | 455/456 |
| 6,061,551 A * | 5/2000 | Sorrells et al. | 455/118 |
| 6,091,359 A * | 7/2000 | Geier | 342/357.14 |
| 6,111,541 A * | 8/2000 | Karmel | 701/213 |
| 6,173,176 B1 * | 1/2001 | Worger et al. | 455/445 |
| 6,278,921 B1 * | 8/2001 | Harrison et al. | 701/35 |
| 6,292,132 B1 * | 9/2001 | Wilson | 342/357.02 |
| 6,330,452 B1 * | 12/2001 | Fattouche et al. | 455/456 |
| 2001/0014604 A1 * | 8/2001 | Kingdon et al. | 455/427 |

* cited by examiner

Primary Examiner—William A. Cuchlinski, Jr.
Assistant Examiner—Tuan C To
(74) Attorney, Agent, or Firm—Michael de Angeli (57) ABSTRACT

A vehicle monitoring system provides real time monitoring of vehicles by receiving position and operational conditions from mobile units over a wireless communication link, such as a cellular telephony connection. In one embodiment, the mobile unit is equipped with both a Global Positioning System (GPS) receiver and a dead reckoning device, which provides position information when the GPS receiver is unable to receive GPS positions from a GPS satellite (e.g., when the vehicle is in a city area surrounded by tall buildings). A novel position request protocol allows multiple position reports to be included in a single data packet, thereby reducing the air time cost of transmitting data over a cellular telephony link. A novel antenna cable detects and reports tempering of a GPS antenna.

13 Claims, 7 Drawing Sheets

(a) Command sent from the control centre to GPSM-2000 mobile unit

| Syntax: | $Tddhhmmss# |
|---|---|
| Meaning: | To request the GPSM-2000 mobile unit to report ten times of its position in the time interval as specified in ddhhmmss, where<br>dd = days, (in decimal number)<br>hh = hours, (in decimal number)<br>mm = mins (in decimal number) and<br>ss = seconds (in decimal number) |
| Special codes: | $T99999999# means a request to poll the GPSM-2000 mobile unit position for once only.<br>$T00000000# means to stop the GPSM-2000 mobile unit from further reporting its position for the request it is executing. |

Fig. 9a

(b) Data sent from the GPSM-2000 mobile unit to the control centre

| Syntax: | $xxxxxxxx#$xxxxxxxx3$xxxxxxxx#<br>or<br>$SOSSOSSOS#$xxxxxxxx# |
|---|---|
| Meaning: | $xxxxxxxx#$xxxxxxxx#$xxxxxxxx# means a report of 3 positioning data<br>$SOSSOSSOS#$xxxxxxxx#<br><br>Where $xxxxxxxx# stands for a frame of positioning information, as described below:<br><br>$ssnnnnnnnneeeeeeeevvvvvvvvddddhhmmsseeeecc#<br>(Please note these fields are little endian hexadecimal numbers)<br>ss = the number of satellite signals received by the GPS receiver<br>nnnnnnnn = latitude (unit: 0.00000001 radian)<br>eeeeeeee = longitude (unit: 0.00000001 radian)<br>vvvvvvvv = speed (unit: meter/second)<br>dddd = direction (unit: 0.001 radian)<br>hh mm ss = time in hour minute second<br>eeee = Expected horizontal position error (unit: 0.01 meter)<br>cc = Car number |

Fig. 9b (a) Command sent from the control centre to GPSM-2000 mobile unit

| Byte number | Description | Contents |
| --- | --- | --- |
| Byte 0 | PDU Identifier | '@' |
| Byte 1 | Command | 01 stands for position report request |
| Byte 2 - 5 | Time interval between each position report | 32-bit little endian integer |
| Byte 6 - 7 | Number of position report required | 16-bit little endian integer<br>0000 means stop position report<br>FFFF means keep sending until being stopped |

Fig. 10a (b) Data sent from the GPSM-2000 mobile unit to the control centre

| Byte number | Description | Contents |
| --- | --- | --- |
| Byte 0 | PDU Identifier | '@" |
| Byte 1 | Report type | 'S' stands for emergency<br>'0" stands for normal |
| Byte 2 | I/O Status | Each bits of the bytes stand for I/O status |
| Byte 3 | Positioning format | 00 for Rockwell binary 1000<br>01 for NMEA |
| Byte 4 - 7 | Latitude | 32-bit little endian integer |
| Byte 8 - 11 | Longitude | 32-bit little endian integer |
| Byte 12 - 15 | Speed | 32-bit little endian integer |
| Byte 16 - 17 | Direction | 16-bit little endian integer |
| Byte 18 | Hour | 8-bit integer |
| Byte 19 | Minute | 8-bit integer |
| Byte 20 | Second | 8-bit integer |
| Byte 21 - 24 | Expected horizontal position error | 32-bit little endian integer |
| Byte 25 - 28 | Car number | 32-bit little endian integer |
| Byte 29 - 39 | Reserved | All in 00 |
| Byte 40 - 79 | Same as Byte 0 - 39 for second position information frame | |
| Byte 80 - 119 | Same as Byte 0 - 39 for second position information frame | |

Fig. 10b

WIRELESS VEHICLE MONITORING SYSTEM

This application claims the benefit of provisional application No. 60/210,172, filed Jun. 6, 2000.

BACKGROUND OF THE INVENTION

1. Field of the Invention

The invention generally relates to monitoring a vehicle using an in-vehicle navigation and communication system.

2. Discussion of the Related Art

The ability to monitor in real time the location of a vehicle has many applications. For example, a stolen vehicle can be easily recovered if it is equipped with a device that reports its location. As another example, a police squad car or an ambulance can be directed to crime scene or an accident easily without requiring the driver to provide constant updates of his or her position to the dispatcher. The location of a moving vehicle can be obtained based on position information from the global positioning system (GPS) satellites. However, receiving GPS positioning information requires that the receiver is has unobstructed line-of-sight view to a GPS satellite. Such a view may not be available when the vehicle's view to the satellite is unobstructed by surrounding tall buildings. Accordingly, a system which can overcome this problem to report adequately accurate positioning information is valuable in a vehicle monitoring system operating in a city.

SUMMARY OF THE INVENTION

The present invention provides a positioning unit ("mobile unit"), which includes a GPS receiver for positioning the moving vehicle. Furthermore, the mobile unit is equipped with a wireless communication capability, including internet access, using a cellular telephony communication protocol, such as GSM, CDPD, and CDMA. Where surrounding buildings obstruct the GPS receiver, the mobile unit uses a "dead reckoning" (DR) technique to provide positioning information. In one embodiment, a gyroscope and a digital compass are provided in the mobile unit to provide this DR capability.

The present invention can be used in conjunction with a vehicle monitoring system linked to a wide area network. In one embodiment, a monitoring station in the vehicle monitoring system communicates with the mobile unit over a wireless communication link. Such a vehicle monitoring system can hierarchically structured, so that local monitoring stations ("base stations") can be provided to cover different vicinities in the service area of the vehicle monitoring system. These local monitoring stations are coordinated by a central monitoring station.

According to the present invention, a mobile unit which communicates with a control center of a vehicle monitoring system includes: (a) an interface to a GPS receiver for receiving from the GPS receiver a first set of position information; (b) an interface to a dead reckoning device for receiving from the dead reckoning device a second set of position information; (c) a signal processing unit selecting between the first and second sets of position information; (d) a communication interface for communicating with the control center; and (e) a control unit that controls the signal processing unit and the communication interface. In that embodiment, the control unit retrieves from the signal processing unit the selected set of position information and provides the selected set of position information to the control center over the communication interface. The control unit further includes a storage device for accumulating said selected position information. In typical operation, when the GPS receiver has unobstructed access to a GPS satellite, the mobile unit selects the GPS position information over the position information from the dead reckoning device. In one embodiment, the dead reckoning device receives signals from a digital compass.

In accordance with another aspect of the present invention, the GPS receiver interfaced to the mobile unit includes a novel antenna cable that is designed to prevent unauthorized tempering of the GPS receiver. In one embodiment, the antenna cable includes: (a) a first conductor for providing a DC voltage to a first terminal of the antenna; (b) a second conductor for providing a ground reference to a second terminal of the antenna; and (c) a third conductor having a first end coupled to the second conductor to form a ground loop and a second end that can be made available for connection to a continuity sensing circuit. In one implementation, the third conductor has less than 2.5 ohms of impedance as seen from said second end. When the continuity sensing circuit detects an open circuit in the ground loop (e.g., the antenna cable is cut to prevent reception of GPS signals), an alarm signal is raised. The mobile unit can report the alarm condition to the control center, which can then take appropriate measures.

The present invention provides, in a vehicle monitoring system, a method for reporting position data from a mobile unit in a data packet. In that method, the mobile unit first receives from the control center a request to send a specified number of positions over a specified time interval. In response, the mobile unit acquires the number of positions from a positioning device (e.g., GPS) in the mobile unit over the specified interval, while accumulating the acquired positions in a storage device. The mobile station reports the accumulated positions in the data packet whenever the unreported acquired positions would require a report reaching a predetermined data size. Typically, the predetermined data size represents filling up the full length of data packet as much as possible. One embodiment uses an SMS data packet in a GSM/PSC communication system. Under SMS, data packet positions are reported in text mode or data mode. In addition to requesting multiple positions, the control center can also request for a single position, which is reported immediately.

The present invention has applications in transportation administration, in-road entertainment, road guidance, and theft prevention.

BRIEF DESCRIPTION OF THE DRAWINGS

To simplify the detailed description below and to facilitate cross-reference among elements in the figures, like elements are assigned like reference numerals.

The present invention is better understood upon consideration of the detailed description below and the accompanying drawings.

DETAILED DESCRIPTION OF THE PREFERRED EMBODIMENTS

Figure 4:
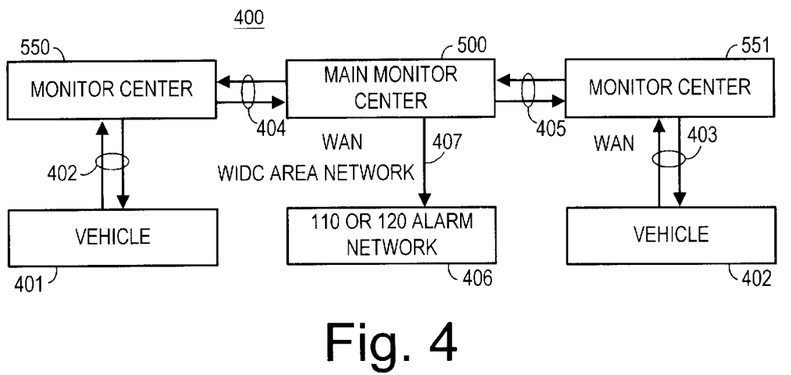
FIG. 4 is a block diagram showing the structure of vehicle monitoring system 400, in accordance with one embodiment of the present invention.

The vehicle monitoring system according to the present invention includes a mobile unit to be installed in a vehicle, a number of local monitoring stations ("base stations") forming a network for communicating with the mobile unit, and a central monitoring station. FIG. 4 is a block diagram showing the structure of vehicle monitoring system 400, in accordance with one embodiment of the present invention. As shown in FIG. 4, vehicle monitoring system 400 includes a main or central monitoring center 500 and base stations 550 and 551. Mobile units in vehicles 401 and 402 are shown in FIG. 4 to communicate with base stations 550 and 551, respectively, over wireless communication links 402 and 403. Wireless communication links 402 and 403 can each be either direct connection over a cellular telephone network, such as a GSM/PCS cellular telephone system communication using Short Message Service (SMS) mode messages, or a connection over a wide area network (e.g., the internet) in which part of the connection is a wireless link established between a network gateway and the mobile unit in the vehicle. Central monitoring station 500 communicates with base stations 550 and 551 over communication links 404 and 405, respectively. Communication links 404 and 405 can also be connections over a wide area network. In addition, central monitoring station 500 communicates with a service network 406 over a network connection 407. Service network 406 can be an emergency services network, for example, as described in further detail below.

When a moving vehicle (e.g., vehicle 402) which is equipped with a mobile unit 100 enters the service area of vehicle monitoring system 400, mobile unit 100 registers with central monitoring station 500 and transmits its acquired positioning information via a wireless communication link. Of course, as illustrated in FIG. 4 discussed above, vehicle monitoring network 400 is a hierarchical system in which mobile unit 100 may not communicate to central monitoring station 500 directly, but through a base station, such as base station 550.

Figure 1:
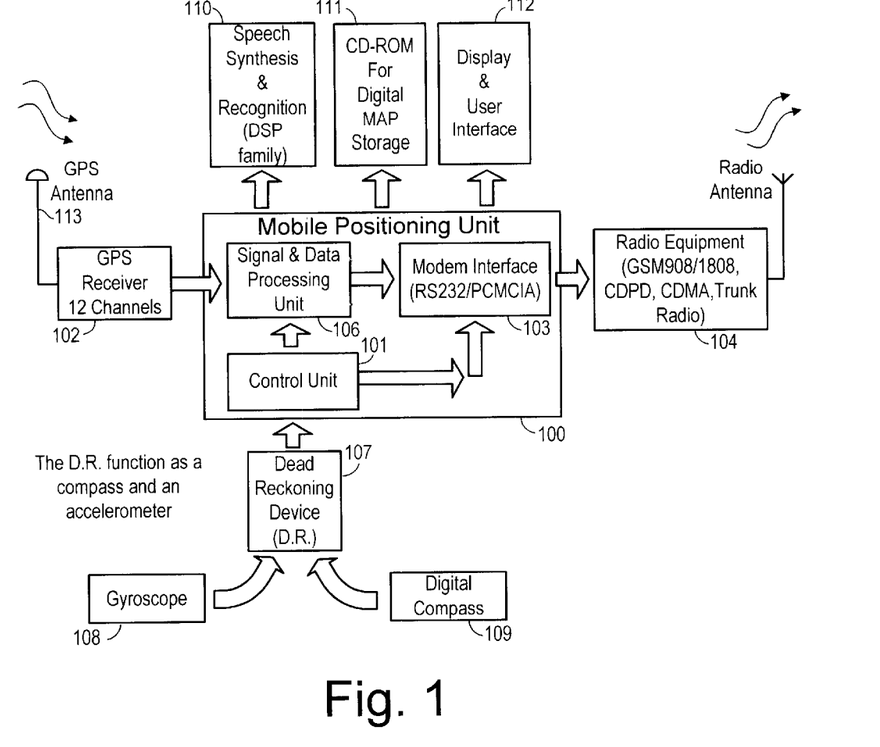
FIG. 1 is a functional block diagram showing the components of mobile unit 100, in accordance with one embodiment of the present invention.

FIG. 1 shows a functional block diagram of mobile unit 100. As shown in FIG. 1, mobile unit 100 includes a signal and data processing unit 106, a wireless modem interface 103 to radio equipment 104, and control unit 101, which controls the operation of mobile unit 100. Mobile unit 100 has access to GPS receiver 102, which includes GPS antenna 113. GPS receiver 102 provides positional data received from GPS satellites to signal and data processing unit 106. In addition, mobile unit 100 also has access to a "dead reckoning" device 107, which provides positional data to mobile unit 100, when GPS receiver 102 loses line-of-sight access to GPS satellites. Dead reckoning device 107 provides positional information based on velocity and directional signals received from gyroscope 108 and a digital compass 109. Digital compass 109 can be, for example, a digital compass based on the KMZ51 and KMZ52 integrated circuits available from Philips Semiconductor Corporation. Data received from GPS receiver 102 or dead reckoning device 107 can be processed by signal and data processing unit 106 and provided, under control of control unit 101, to base station 551 through a wireless communication link established using, for example, radio equipment used with any GSM, CDPD, CDMA or trunk radio system. Signal and data processing unit 106 can be provided, for example, by a 80196 microprocessor, available from a variety of sources. Wireless modem interface 103 provides data modem functions for transmitting and receiving data over the wireless communication link. In addition, to support various applications built upon mobile unit 100, mobile unit 100 can be interfaced to speech synthesis and recognition system 110, mass storage device 111 and display and user interface 112. Speech synthesis and recognition system 100 can be used, for example, to deliver driving directions verbally or to provide a verbal user interface to control mobile unit 100. Mass storage device 111 can be used, for example, to house a map library that can be used to serve maps. Display and user interface unit 112 provides a console for conventional user interaction with mobile unit 100.

Figure 2:
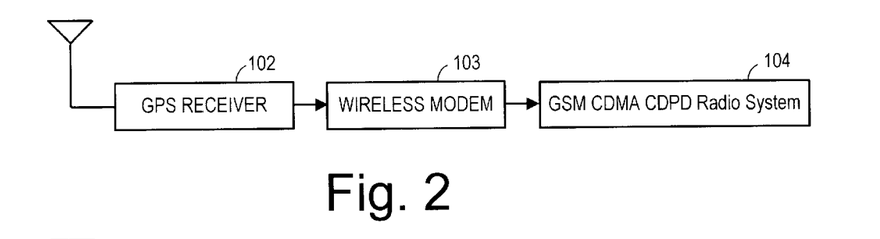
FIG. 2 shows the data flow in mobile unit 100 of FIG. 1.
Figure 3:
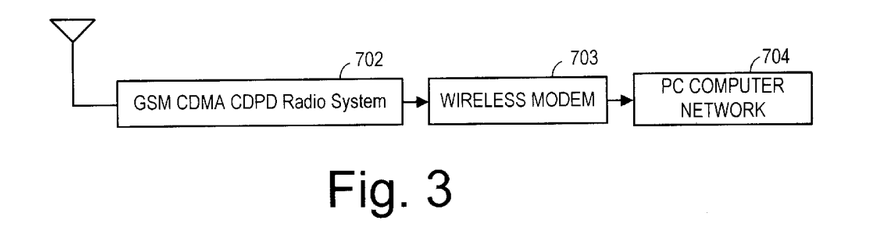
FIG. 3 shows the data flow in base station 550 of FIG. 5 below, in accordance with one embodiment of the present invention.

FIGS. 2 and 3 show the data flow in mobile unit 100 and base station 550 respectively. As shown in FIG. 2, and as discussed above, position data received in GPS receiver 102 is sent through wireless modem interface 103 and wireless equipment 104 to base station 550. As shown in FIG. 3, base station 550 receives the position data from mobile unit 100 at its own wireless equipment 702. The positional data is recovered using modem interface 703. Base station 550 can relay the received positional data to central monitoring station 500 through a connection in computer network 704. During operation, central monitoring station 500 or base stations 550 and 551 can send commands over the wireless link, over a wide area network when necessary, to mobile unit 100. These commands may include an immediate request for mobile unit 100's position, a request to send position information over a specified time period, a request to reset an alarm received from mobile unit 100, or a reset of communication data rate or frequency band.

Mobile unit 100 can also function as a personal computer for the driver, to allow the driver access to a wide area computer network (e.g., the internet) through the console of display and user interface unit 112 to obtain such service as transmitting and retrieving electronic mail messages, or obtaining navigation assistance either through an electronic map from mass storage device 111 displayed on the console of mobile unit 100 or through audible driving directions provided by speech recognition and synthesis unit 110.

Figure 5:
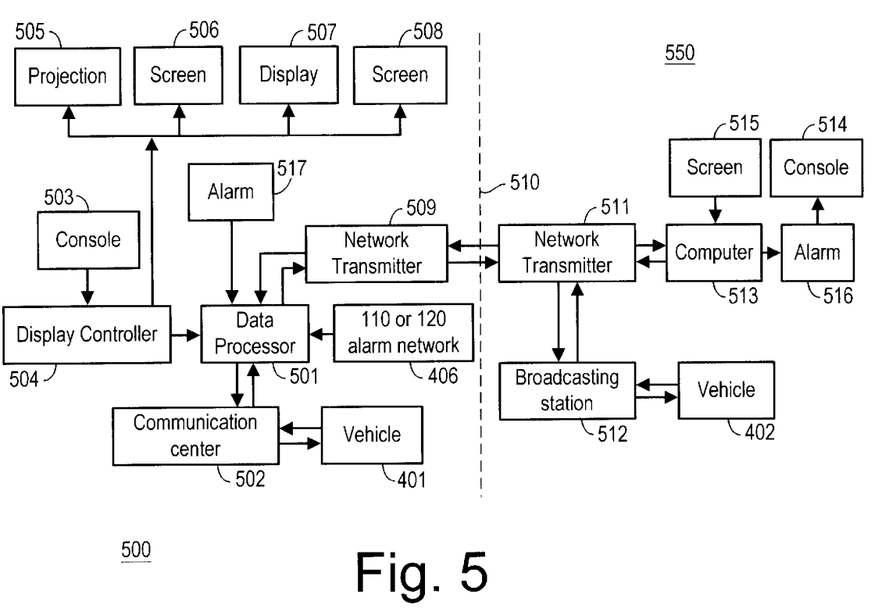
FIG. 5 is a block diagram of central vehicle monitoring station 500 and local monitoring station or base station 500, in accordance with one embodiment of the present invention.

FIG. 5 shows the internal structures of central monitoring station 500 and base station 550. As shown in FIG. 5, monitoring center 500 includes a data processing network, which may include workstations, personal computers, GIS, GSM-SMS Server terminals. In FIG. 5, a representative workstation 501 of data processing network is provided.

Workstation 501 communicates with vehicle 401 using communication equipment 502, for example. An operator may sit behind console 503 to provide service to vehicle 401. Console 401 is coupled to display controller 502, which can be used under control of the operator behind console 401 to provide information to a variety of display devices 505, 506, 507 and 508 located throughout central monitoring station 500. Central monitoring station 500 communicates using network access equipment 509 with a wide area network 510 with base station 550. As mentioned above, workstation 501 has access to service network 406. Of course, the operator behind console 503 can also respond to any alarm condition received through alarm interface 517.

In one embodiment, base station 550 is implemented as a Nokia™ Card Phone GSM/CDPD/CDMA Base station. By interfacing with a cellular telephone system, base station 550 can communicate with both mobile unit 100 and central monitoring station 500 using wireless communication. This implementation provides excellent adaptability so that the base station can access the internet readily, and provides also an anti-jamming capability. The cellular telephone system also allows vehicle monitoring system 400 to widen its volume and coverage area by utilizing the extensive roaming network outside of its service area. At the same time, by using SMS mode, base station 550 can greatly reduce the cost to the users and can provide voice and date services. In base station 550, computer 513 can be provided to control communication interface 511 with network 510. Base station 550 can also provide a broadcasting capability (e.g., broadcasting station 512) to communication with mobile units in vehicles in its vicinity, such as vehicle 402. Of course, a console (e.g., console 514) can be provided at base station 550, with an operator sitting behind console 514 and responding to mobile unit 100 based on information displayed on display 515. The operator can also respond to alarm condition received in alarm interface 516.

In one embodiment, mobile unit 100 can transmit an alarm signal to central monitoring center 500, either directly or through a base station. Central monitoring center 500 then routes the alarm signal to a help center in service network 406. At the help center, an attendant can review mobile unit 100's position through a visual display. Information such as the alarm condition, the time the alarm was sent, the vehicle model and color, the driver's name, address, and telephone number, and the direction of travel can be displayed and stored. Thus, the help center can respond to the need and provide useful information to the driver of mobile unit 100. Central monitor center 500 can also broadcast traffic information (such as road blocks or traffic jams) through broadcasting station 512 to mobile units within the vicinity of the traffic problem and can also assist the driver in finding alternate routes. Mobile unit 100 can also provide access to entertainment or other product and sales information.

Vehicle monitoring system 400's capability includes the following:

(1) Auto alarm: When a moving vehicle is robbed or stolen, the system automatically sends out an alarm signal, and can direct mobile unit 100 to take defensive measures, such as cutting off the vehicle's power supply and fuel supply. Also vehicle monitoring system 400 system would locate the position of the vehicle and ascertain its condition.

(2) Accident alarm: When the moving vehicle has an accident, the driver can seek help from the transport control center—a kind of service network. The driver can also get support from an accident handling system via the internet.

(3) Vehicle trespassing alarm: Vehicles can be installed with the mobile units and registered with central monitoring station 500 to include a trespass alarm service. Under this service, when a vehicle is driven beyond a predetermined permissible area, the mobile unit would automatically transmit a trespass alarm to inform to central monitoring station 500.

(4) Vehicle real time tracking: According to users requirements, vehicle monitoring system 400 can track the moving vehicle's position in real-time to provide a tracking map and distribute this data to others in the network.

(5) Hierarchical monitoring station structure: Vehicle monitoring system 400 includes central monitoring station 500 and administrates base stations 550 and 551.

(6) Network attendance check: having the ability to communicate to all base stations, the vehicle monitoring system 400 can allow central monitoring station 500 to determine the presence and identities of users within its service area at any given time.

(7) Nation-wide tracking capability: the wireless telephone network enables nation-wide tracking of mobile units through roaming arrangements.

Figure 6:
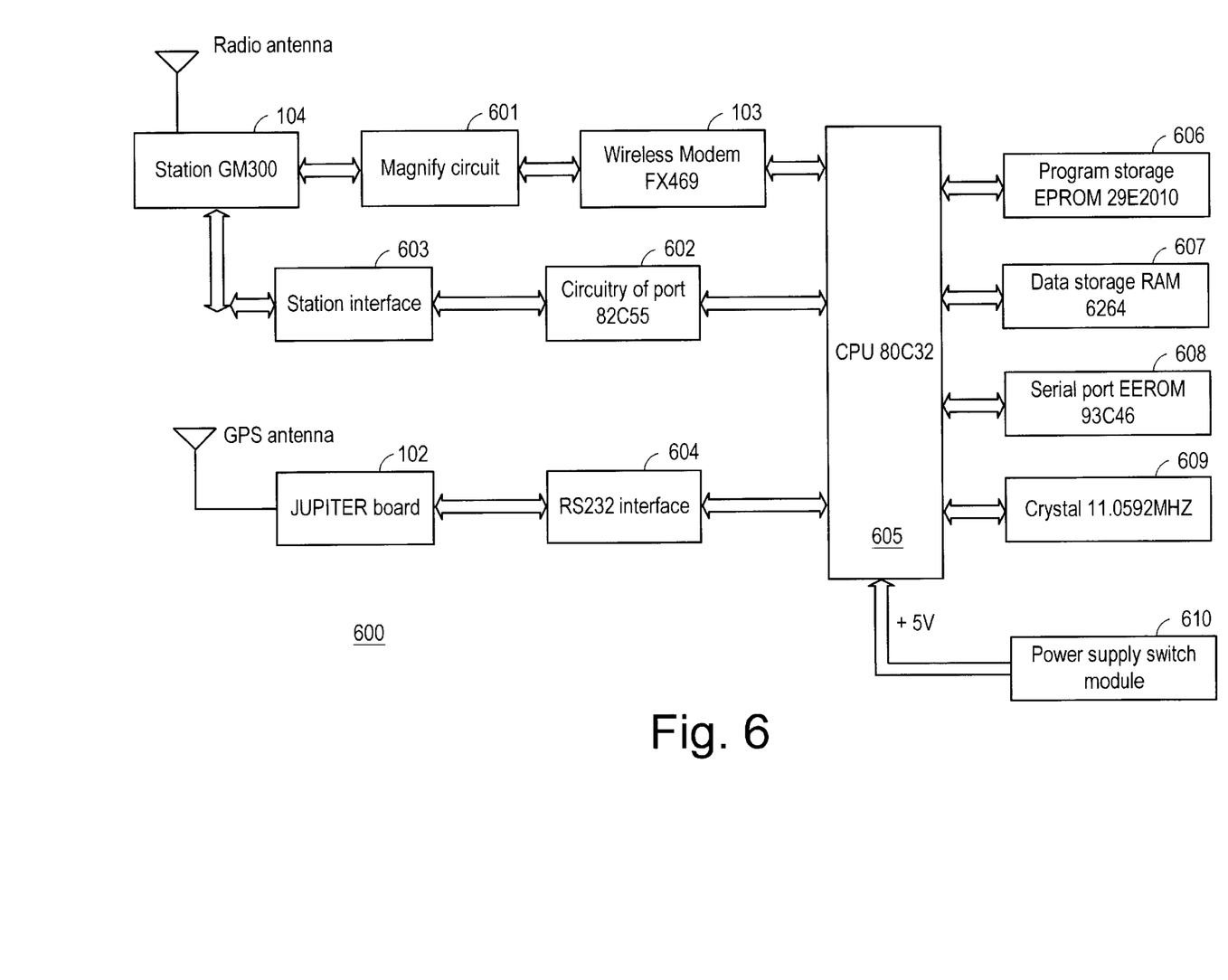
FIG. 6 is a block diagram of one implementation of mobile unit 100.

FIG. 6 is a block diagram of one implementation 600 of mobile unit 100. As shown in FIG. 6, implementation 600 includes power supply unit 610 which provides power to control unit 101. In implementation 600, control unit 101 and data and signal processor unit 106 are implemented by a microprocessor 605, non-volatile read-only memory (ROM) 606 for storing firmware, random access memory (RAM) 607, serial port 608, time base (crystal) 609, and programmable input/output (I/O) port 602. Microprocessor 605 can be provided by a conventional 80C32 microprocessor. ROM 606 can be provided by a electrically programmable read-only memory (EPROM), such as the 29E2010 EPROM. RAM 607 can be provided by the 6264 integrated circuit which provides 8K bytes of storage. Serial port 608, which can be used to receive operational data from the vehicle's control system, can be provided by the 93C46 integrated circuit. Crystal 609 provides a time-base for microprocessor 605. Programmable I/O port can be implemented by conventional 82C55 integrated circuit available from Intel Corporation.

In implementation 600, GPS receiver 102 can be implemented by a "Jupiter" board based on the Jupiter GPS chipset available from Conexant Systems, Inc. GPS receiver 102 communicates with microprocessor 605 over an industry standard RS-232 interface 604. Radio equipment 104 is implemented in implementation 600 by a GM300 mobile radio available from Motorola Corporation. Radio equipment 104 communicates with microprocessor 605 either through a wireless modem 103, or programmable I/O port 602. Wireless modem 103 can be provided by an FX469 wireless modem integrated circuit available from, for example, Consumer Microcircuits Limited (CML). Signals communicated between wireless modem 103 and radio equipment 104 can be mediated by amplifier circuit 601. Similarly, a station interface 603 is provided between radio equipment 104 and programmable I/O port 602.

Figure 7:
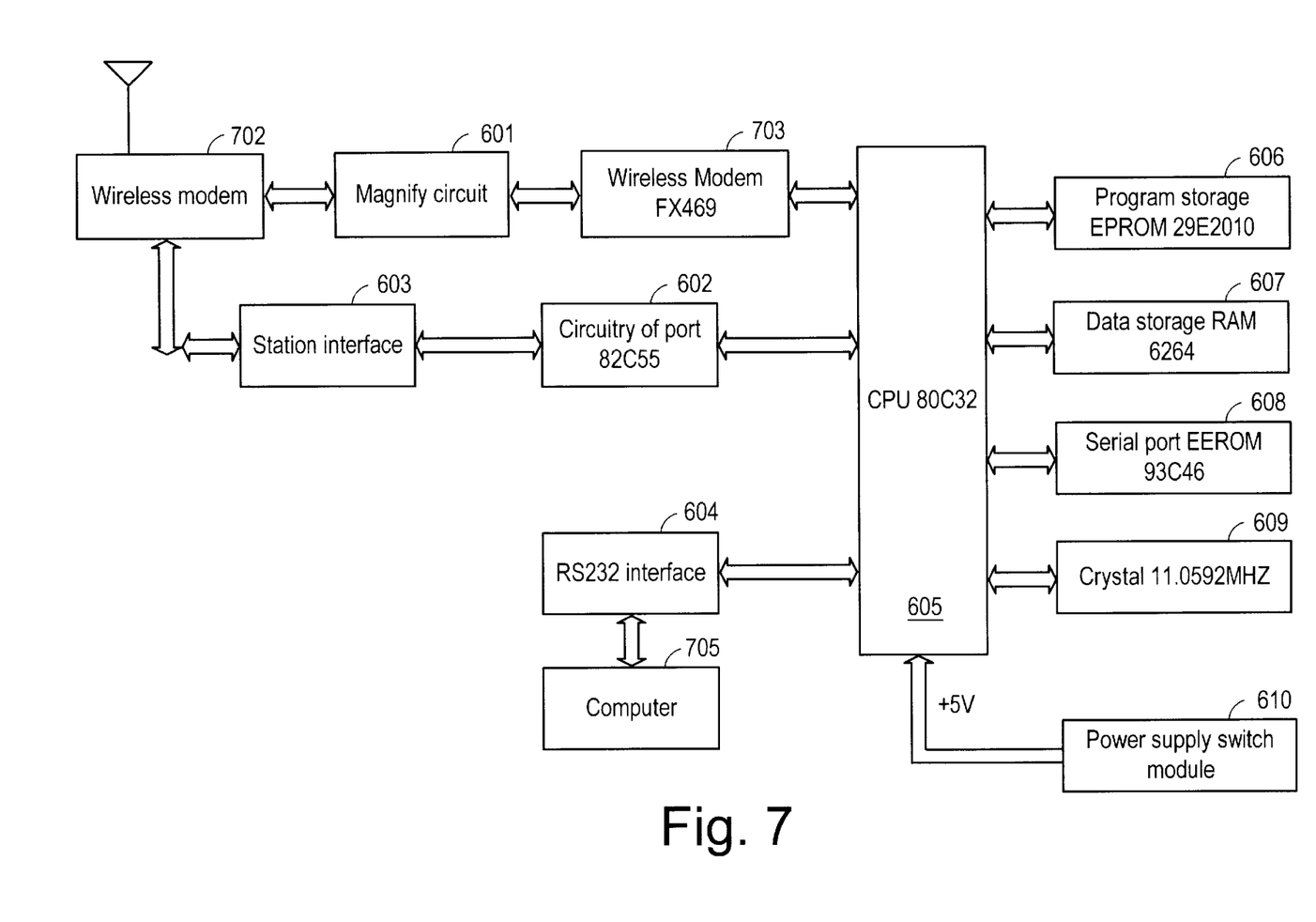
FIG. 7 is a block diagram of one implementation of base station 550 of FIG. 5.

FIG. 7 is a block diagram of implementation 700 of base station 550 of FIG. 5. As shown in FIG. 7, implementation 700 for base station 550 is substantially the same circuit as implementation 600 for mobile unit 100, except that, in implementation 700, RS-232 interface 604 connects computer 705 rather than a GPS receiver. Computer 705 can be provided by, for example, a conventional personal computer.

Detailed description for components of implementation 700 common with components in implementation 600 are omitted to avoid repetition.

Figure 8:
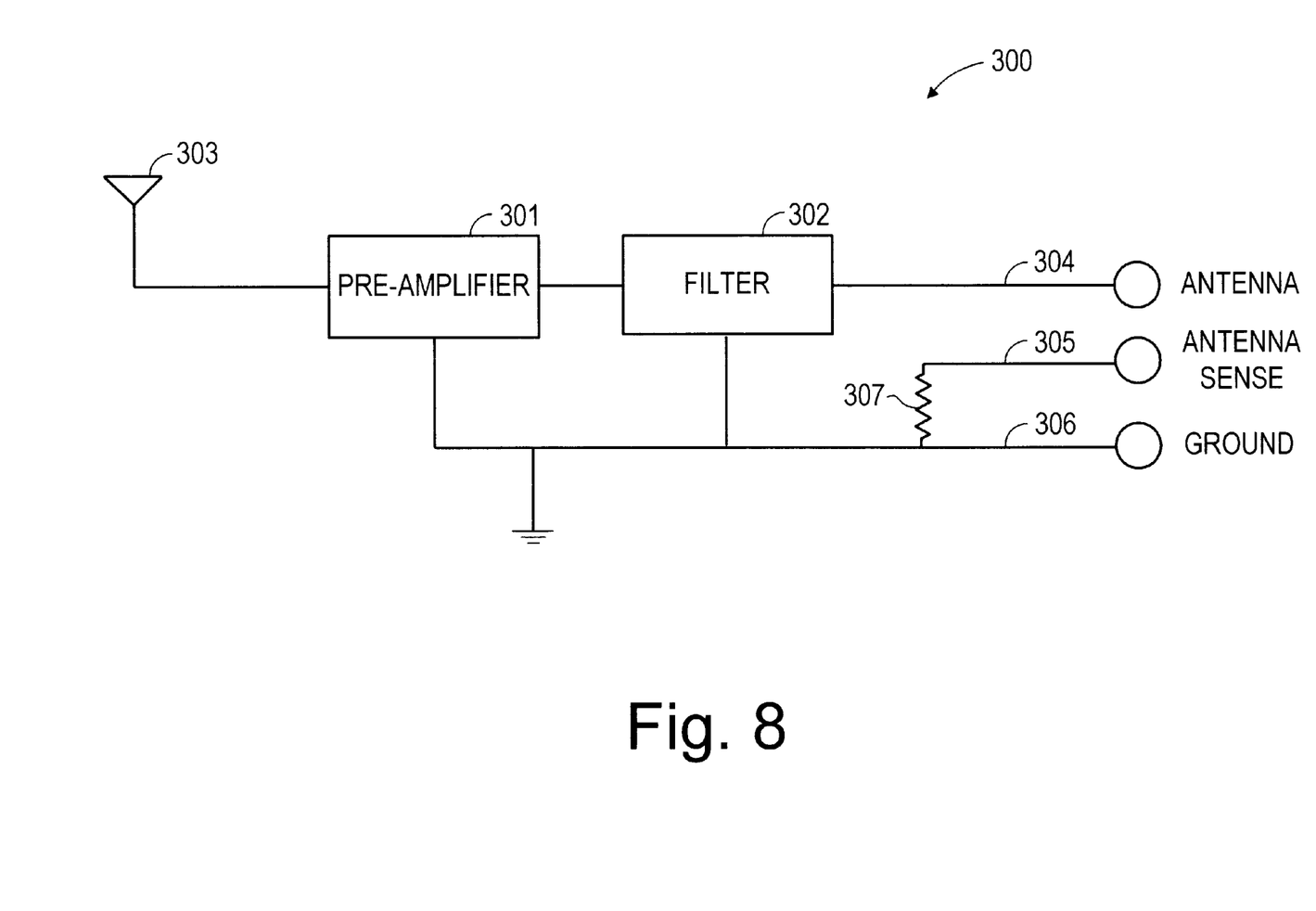
FIG. 8 shows a schematic diagram of a GPS antenna 300, in accordance with one embodiment of the present invention.

In accordance with another aspect of the present invention, mobile unit 100 can be used in conjunction with a GPS antenna that is provided with an alarm condition sensor. Since mobile unit 100 can be used to locate a vehicle, a person seeking to evade being located (e.g., a car-jacker) will be motivated to remove the tracking capability by tempering with the antenna cable. The present invention provides protection against tempering with the GPS antenna cable. In one embodiment of the present invention, the GPS antenna is provided with an additional cable attached to the output connector (e.g., BNC connector) of the regular antenna cable. The additional cable ("sensor cable") is provided as a ground loop which is seen to have an impedance of 2.5 ohms. FIG. 8 shows a schematic diagram of a GPS antenna 300, in accordance with one embodiment of the present invention.

As shown in FIG. 8, GPS antenna 300 includes antenna 303, preamplifier 301 and filter 302. In GPS antenna 300, the GPS receiver provides a 5 volt DC signal on terminal 304. The signal received in antenna 303 from the GPS satellites is amplified by amplifier 301, band-pass filtered by filter 302 and superimposed as an AC signal on the 5 volt DC signal on terminal 304. The sensor cable is represented in FIG. 8 by impedance 307 and terminal 305. One end of the sensor cable (i.e., terminal 305) is coupled to a sensor terminal of an impedance sensing circuit. The other end of the sensor cable is coupled to ground terminal 306. Normally, the 2.5 ohms impedance of the sensor cable is presented to the impedance sensing circuit as a short circuit. If the external antenna cable is cut, vandalized or improperly removed, the impedance sensing circuit senses an open circuit condition in the ground loop. In that event, an alarm signal can be sent to central monitoring station 500, and an indicator light on the housing of mobile unit 100 can also be activated.

Upon initialization, mobile unit 100 typically performs a self-diagnostic test, which includes initialization of its components and systems under control, such as GPS receiver 102, RAM 607, EPROM 606, serial port 608, or antenna 300. If a fault condition is detected in any of its components or systems under control, the error condition is reported back to central monitoring station 500 as an alarm condition, if possible. Indicator lights provided on the housing of mobile unit 100 are also illuminated to signal the fault condition to the vehicle operator. If the self-diagnostic test indicates that mobile unit 100 is operable, as mentioned above, mobile unit 100 receives commands from central monitoring station 500 or base stations 550 and 551. In one embodiment, the monitoring stations may request position information from mobile unit 100. As the cost of communication over a cellular network is often based on air-time, minimizing air time can reduce the cost of operating mobile unit 100. Thus, in one embodiment, an efficient position request protocol designed to report multiple positions in a single communication packet (e.g., an SMS packet in a GSM/PCS system) is provided.

Figure 9A:
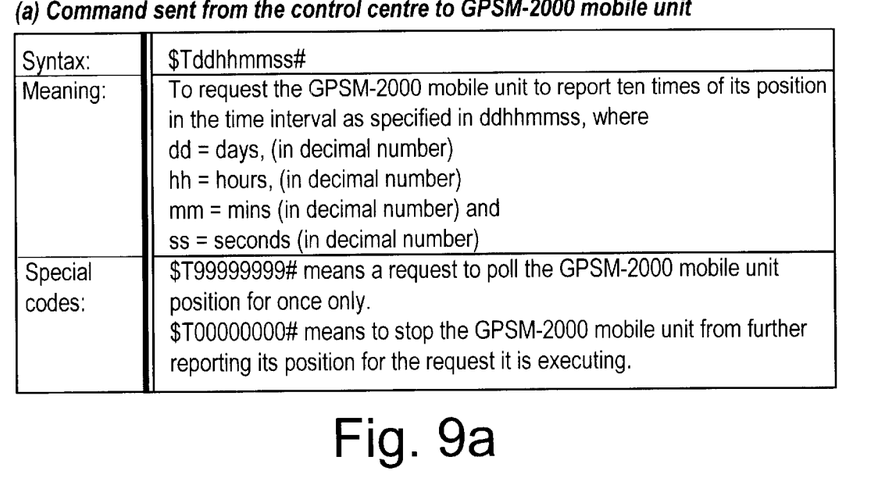
FIG. 9a shows the request formats for scheduled and emergency position requests under text format from a monitoring station.
Figure 9B:
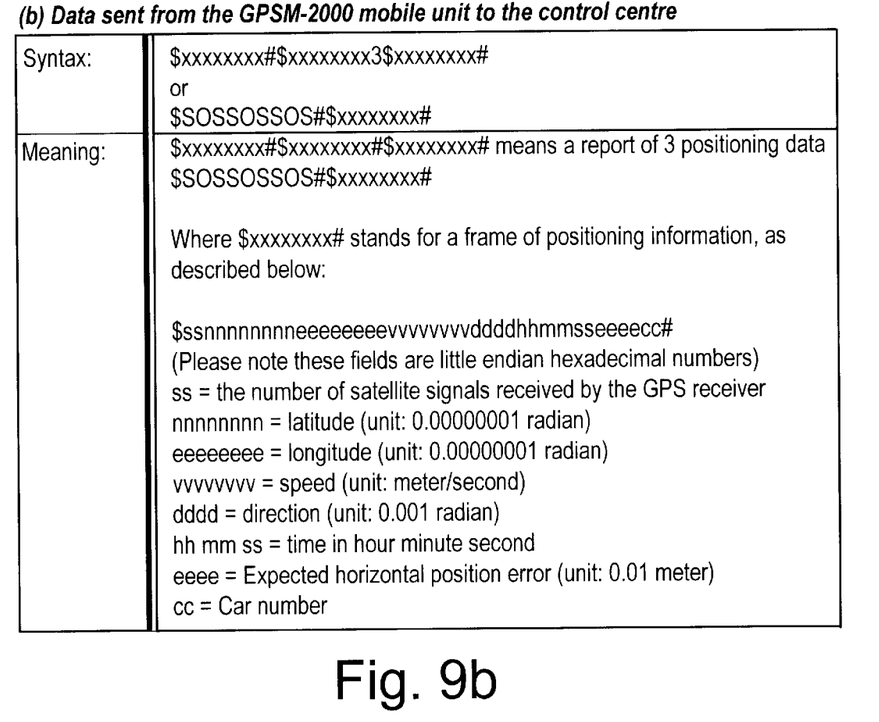
FIG. 9b shows the response formats for scheduled and emergency position requests under text format from mobile unit 100.

According to the efficient position request protocol, the monitoring stations can request either (a) a scheduled position report of ten positions over a period of time, and (b) an emergency request for position of one position. Under SMS, a text mode or a non-text mode ("PDU") protocol can be used. FIG. 9a shows the request formats for scheduled and emergency position requests under text format from a monitoring station. FIG. 9b shows the response formats for scheduled and emergency position requests under text format from mobile unit 100. As shown in FIG. 9a, to send a position request, the monitoring station sends, in the user payload portion of a single packet under SMS, the ascii character "T" followed by a 8-character string ddhhmmss and the ascii character "#", where the 2-character strings dd, hh, mm, ss are decimal values representing days, hours, minutes and second respectively. If "99999999" is specified, the request is an emergency single position request. If "00000000" is specified, the monitoring station is terminating further reporting. Otherwise, the request is a scheduled request for ten positions. For example, the string "T00000A00#" represents a request for ten positions over ten minutes. In response, mobile unit 100 divides the requested time by 10 to obtain the specified position acquisition interval, and schedule collection of its positions for 10 acquisition intervals. In this example, mobile unit 100 would acquire its position every minute. However, to minimize air time cost, mobile unit 100 accumulates the acquired positions and transmits the accumulated report when the reports for these accumulated positions substantial fill a SMS data packet. Three reports in this embodiment fill a SMS packet, as shown in FIG. 9b.

In FIG. 9b, for a response to a scheduled position request, three frames of data is sent. Each frame represents the report for a single position, and is preceded by an ascii "$" character and terminated by an ascii "#" character. Within each frame contains numbers expressed in hexadecimal in the following fields: (a) a 2-character field indicating the number of satellite signals received by GPS receiver 102, (b) an 8-character field indicating the latitude of the position, (c) an 8-character field indicating the longitude of the position, (d) an 8-character field indicating the velocity of mobile unit at the time of position acquisition, (e) a 4-character field encoding the direction of travel at the time of the acquisition, (f) a six-character field encoding the time in hour, minutes and seconds (each 2-character long), (g) a 4-character field indicating the expected error range in the position reported and (h) a 2-character field identifying the vehicle reporting the position.

For an emergency request, a single frame containing a single position is reported in an SMS packet, the data frame being preceded by the character sequence "SOSSOSSOS" to indicate that it responds to an emergency request.

Figure 10A:
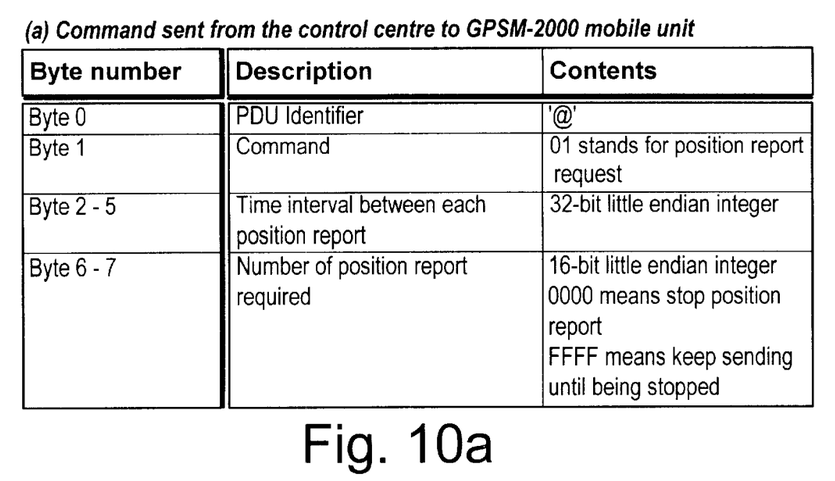
FIG. 10a shows a command packet for a position request under non-text format from a monitoring station.

FIG. 10a shows a command packet for requesting a position under non-text format from a monitoring station. As shown in FIG. 10a, under the PDU protocol, a request for position is an 8-byte frame including: (a) Byte 0, which identifies the PDU format packet by the ascii character "@", (b) Byte 1, which indicates the command (in this case, a position request which is indicated by the hexadecimal value 01), (c) Bytes 2–5 is a 32-bit value specifying the time interval between each position report, and (d) Bytes 6–7, a 16-bit value representing the number of reports required. Under the PDU format, the value 0000 in Bytes 6–7 terminates all reporting, and the value FFFF indicates that reporting should continue at the specified interval until a termination command (i.e., a position request specifying 0000 in Bytes 6–7) is received.

Figure 10B:
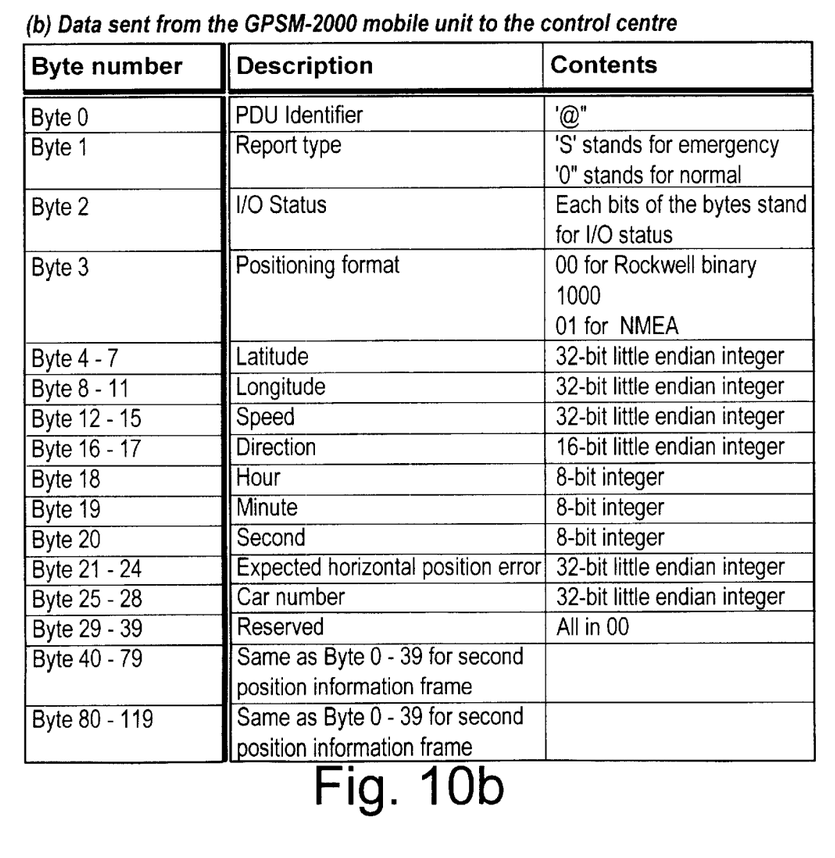
FIG. 10b shows the response format for a position request under non-text format from mobile unit 100.

FIG. 10b shows the response format for a position request under non-text format from mobile unit 100. Under the PDU format, the response is provided as three 40-byte frames for a total of 120-bytes. Each frame having the fields: (a) Byte 0, which identifies the PDU format packet by the ascii character "@", (b) Byte 1, which indicates report type (ascii "S" for emergency and ascii "0" for a scheduled report), (c) Byte 2, which is an 8-bit I/O status report, (d) Byte 3, which is an 8-bit field indicating the format of the position reported (00 for Rockwell Binary 1000 format, and 01 for NMEA format), (e) Bytes 4–7 is a 32-bit value specifying the latitude, (f) Bytes 8–11 is a 32-bit value specifying the longitude, (g) Bytes 12–15 is a 32-bit value specifying the velocity of the vehicle at the time of position acquisition, (h) Bytes 16–17 is a 16-bit value indicating the direction of travel at the time of acquisition, (i) Bytes 18–20 are 8-bit values indicating, respectively, the time in hour, minutes and seconds at the time of position acquisition, (j) Bytes 21–24 is a 32-bit value indicating the expected error range in the position reported, (k) Bytes 25–28 is a 32-bit value identifying the vehicle reporting, l Bytes 29–39 are reserved for future use. The two other frames in the packet are provided beginning at Byte 40 and Byte 80 respectively.

The embodiments described above are illustrative only and do not limit the invention. Furthermore, the present invention is not limited to any particular hardware/software implementation. In fact, hardware, software, or any combination thereof other than those described herein may be used in accordance to the principles of the invention.

We claim:

1. A mobile unit which communicates with a control center of a vehicle monitoring system, comprising:

a GPS receiver connected to a GPS antenna by an antenna cable;

an interface to said GPS receiver for receiving from said GPS receiver a first set of position information;

an interface to a dead reckoning device for receiving from said dead reckoning device a second set of position information;

a signal processing unit for selecting between said first and second sets of position information;

a communication interface for communicating with said control center;

a control unit for controlling said signal processing unit and said communication interface, said control unit retrieving from said signal processing unit said selected set of position information and causing said selected set of position information to be transmitted to said control center over said communication interface;

wherein said said antenna cable comprises a first conductor for providing a DC voltage from a power supply comprised by said GPS receiver to a first terminal of said antenna;

a second conductor for providing a ground reference to a second terminal of said antenna; and a third conductor having a first end and a second end, said first end being coupled to said second conductor to form a ground loop and said second end being connected to a continuity sensing circuit comprised by said GPS receiver.

2. A mobile unit as in claim 1, wherein said control unit further comprises a storage device for accumulating said selected position information.

3. A mobile unit as in claim 1, wherein said signal processing unit selects said first set of position information when said GPS receiver has access to a GPS satellite.

4. A mobile unit as in claim 1, wherein said dead reckoning device receives signals from a digital compass.

5. A mobile unit as in claim 1, wherein said control unit comprises a microprocessor.

6. A mobile unit as in claim 1, wherein said third conductor exhibits less than 2.5 ohms of impedance as seen from said second end.

7. A mobile unit as in claim 1, wherein said continuity sensing circuit provides an alarm signal when said continuity sensing circuit detects an open circuit in said ground loop.

8. A mobile unit as in claim 7, wherein said control unit, upon detecting said alarm signal, provides said alarm signal to said control center.

9. A method for communicating position data from a mobile unit carried by a vehicle to a control center of a vehicle monitoring system, said mobile unit comprising:

a GPS receiver connected to a GPS antenna, said GPS receiver providing a first set of position information;

a dead reckoning device providing a second set of position information;

a signal processing unit for selecting between said first and second sets of position information; and a control and transmitting unit for retrieving said selected set of position information from said signal processing unit and transmitting said selected set of position information to said control center in a data packet transmitted over said communication interface in response to a request received from said control center, said method comprising the following steps, performed by said mobile unit:

receiving a request from said control center to send a specified number of positions over a specified time interval;

acquiring said number of positions from a positioning device in said mobile unit over said specified interval;

accumulating said acquired positions;

monitoring the quantity of unreported accumulated positions; and reporting said unreported accumulated positions in a data packet whenever said quantity of unreported accumulated positions reaches a predetermined data size.

10. The method of claim 9, wherein said data packet comprises a SMS data packet in a GSM/PSC communication system.

11. The method of claim 9, wherein said data packet positions are reported in text mode.

12. An antenna cable for connecting an antenna, comprising:

a first conductor for providing a DC voltage to a first terminal of said antenna;

a second conductor for providing a ground reference to a second terminal of said antenna; and a third conductor having a first end and a second end, said first end being coupled to said second conductor to form a ground loop and, at said second end being available for connection to a continuity sensing circuit.

13. An antenna cable as in claim 12, wherein said third conductor constitute less than 2.5 ohms of impedance as seen from said second end.

* * * * *